May 9, 1950 — C. C. FUERST — 2,507,148
BULB EXPOSURE MECHANISM FOR SETTING SHUTTERS
Filed Jan. 7, 1948
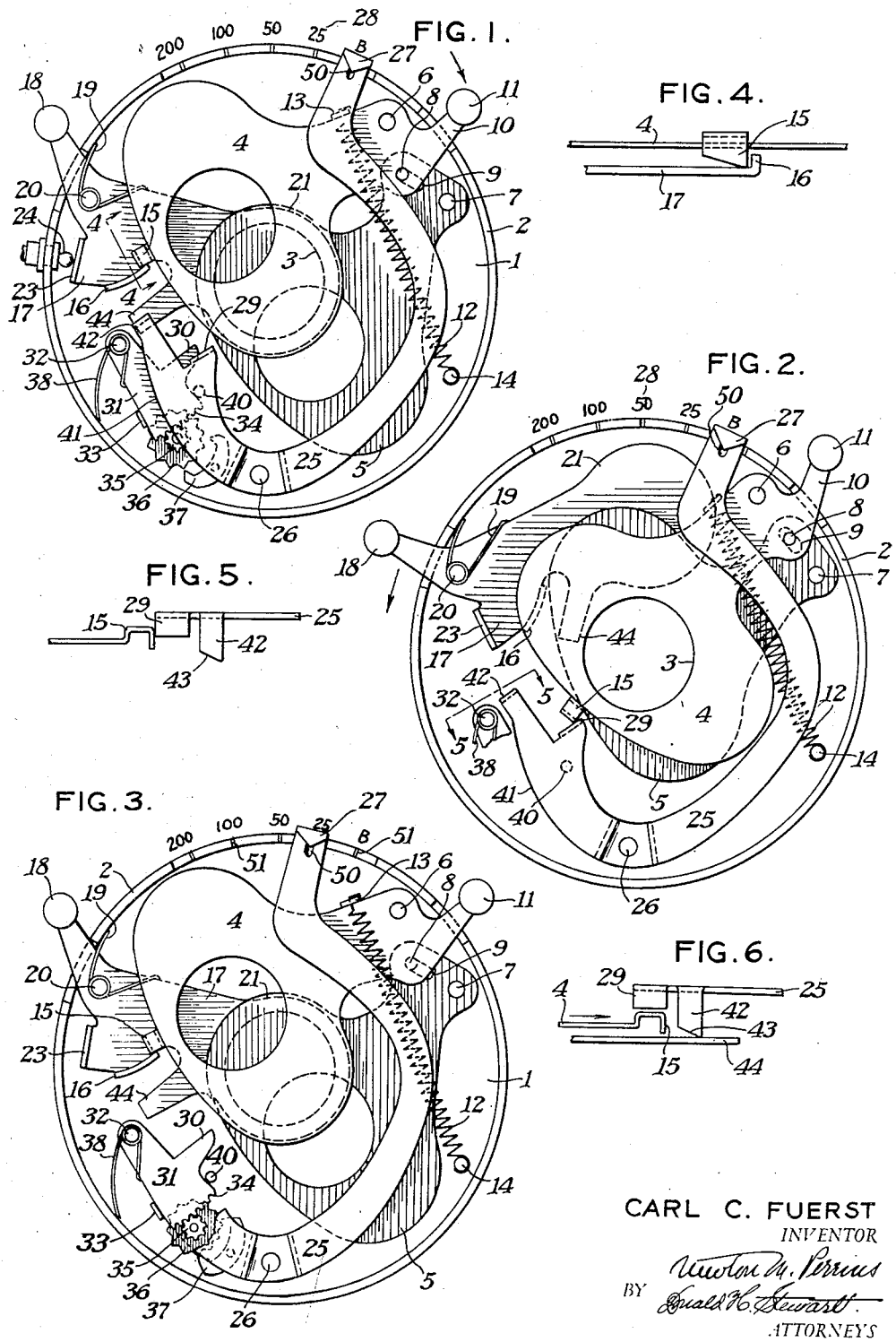
CARL C. FUERST
INVENTOR Patented May 9, 1950

2,507,148

UNITED STATES PATENT OFFICE 2,507,148

BULB EXPOSURE MECHANISM FOR SETTING SHUTTERS

Carl C. Fuerst, Rochester, N. Y., assignor to Eastman Kodak Company, Rochester, N. Y., a corporation of New Jersey Application January 7, 1948, Serial No. 1,007

7 Claims. (Cl. 95—62)

This invention relates to a bulb-exposure mechanism designed particularly for a simple and inexpensive type of shutter. One object of my invention is to provide a bulb-exposure mechanism which is simple in construction and which requires but few shutter parts. Another object of my invention is to provide a bulb-exposure mechanism, the parts of which are also employed for other purposes in the shutter. A still further object of my invention is to provide a shutter bulb-exposure mechanism which prevents rebound of the shutter blades as they are brought to their fully open position, and other objects will appear from the following specification; the novel features being particularly pointed out in the claims at the end thereof.

"Bulb" exposures are generally known in the photographic art as being exposures the length of which may be manually controlled in which the depression of a shutter trigger opens the shutter blades and releasing the shutter trigger closes the blades; these exposures having apparently been called "bulb" exposures from the early days because in the earlier shutters the exposures were made by a bulb and tube, by compressing the bulb to force air into an air cylinder in the shutter to hold the shutter blades open as long as the bulb was compressed.

The bulb-exposure mechanism described in this application is applicable to a simple type of setting two-blade shutter shown in my copending application Ser. No. 1,008, for Two blade setting type shutter, filed January 7, 1948.

Coming now to the drawings wherein like reference characters denote like parts throughout:

Fig. 1 is a top plan view of a shutter including a bulb-exposure mechanism constructed in accordance with and embodying a preferred form of my invention. In this view, the shutter cover is removed and the shutter speed settings are diagrammatically shown in their proper location. The shutter parts are shown set and in position for a "bulb" exposure to be made when the trigger is released;

Fig. 2 is a view similar to Fig. 1 but with the shutter blades shown in a fully open position;

Fig. 3 is a view similar to the preceding figures, but with the shutter parts shown in a set position awaiting a twenty-fifth of a second exposure;

Fig. 4 is a fragmentary detail side elevation taken on line 4—4 of Fig. 1;

Fig. 5 is a fragmentary detail side elevation taken on line 5—5 of Fig. 2 with the parts shown with the blades in their full open position during a "bulb" exposure; and Fig. 6 is a view similar to Fig. 5 showing the relationship of the shutter blade, shutter-setting lever and trigger, after the trigger returns to its normal position of rest, as is shown, for instance, in Fig. 1.

My invention comprises providing for a "bulb" exposure without the use of additional levers by merely forming up a number of stops, or lugs, on parts used for other purposes. For instance, I prefer to provide a bulb stop directly on the shutter-setting lever which is used for setting the shutter for any automatically timed exposure as well as "bulb," and I provide an additional arm on the shutter and cover blind for positioning these stops so that they cannot engage in certain positions.

More specifically, my shutter may consist of a shutter casing 1 having the usual upstanding flange 2 around its periphery and an exposure aperture 3 in the center of the casing. This aperture may be opened and closed by means of blades 4 and 5; these blades being pivotally mounted on pins 6 and 7 carried by the shutter and being connected by means of a pin 8 and slot 9 to move at the same time and in opposite directions. One shutter blade 4 is provided with an extension 10 having a handle 11 which may be moved in the direction shown by the arrow in Fig. 1 for setting the shutter blades to tension a spring 12 which, in this embodiment, is attached to a lug 13 on the shutter blade 4 and to a pin 14 on the shutter casing 1.

In order to hold the blades in the set position, the shutter blade 4 is provided with a beveled lug 15 which extends downwardly and which, when the handle 11 is used for setting, the blade rides up over an arcuate flange 16 carried by a plate 17 which forms the shutter trigger; a trigger handle 18 being attached to the plate 17 to operate it against the pressure of a spring 19 which tends to hold the trigger in its rest position of Fig. 1.

The arcuate flange 16 is a surface of rotation about the pivot 20 of the trigger and it will hold the beveled lug 15 of the shutter blade 4 during movement of the trigger until the cover blind 21, which is an extension of the trigger, moves completely away from the exposure aperture 3, at which time, because the lug 15 is released, the shutter blades will cross the exposure aperture 3 and make an exposure if the shutter is set for instantaneous exposures or the blades will completely open the aperture as in Fig. 2 if the shutter is set for a bulb exposure. The plate 17 is also provided with a flange 23 which may be engaged by the plunger 24 of a cable release if such a release is employed.

When the shutter-setting lever 25, which is pivoted at 26 to the shutter casing, is moved so that the pointer 27 lies opposite "B" on the scale diagrammatically illustrated at 28, a downwardly extending lug 29 is brought into the path of the lug 15 carried by the shutter blade 4. When the lug 15 is released by the flange 16 through movement of the trigger handle 18, the shutter blades can move until the shutter blade lug 15 strikes the lug 29, but before this occurs it is preferable to slow up the movement of the shutter blades so that there will be no rebound from their fully open position shown in Fig. 2. The delay or retard mechanism is used for this purpose. This mechanism includes an arm 30 extending from a lever 31 pivoted at 32 to the shutter casing; the arm 30 being adapted to lie in the path of the shutter blade lug 15. The arm 31 includes an upstanding lug 33 which is adapted to be engaged by an edge 41 of the setting lever 25 when this lever is moved from its "bulb" position toward the other instantaneous exposure positions, or to the left from its Fig. 1 position.

Lever 31 is provided with gear teeth 34 meshing with a pinion 35 which turns a starwheel 36. This starwheel may be engaged by a pallet 37. As the shutter blade 4 swings from its Fig. 1 to its Fig. 2 position, lug 15 strikes arm 30 and rocks lever 31 slowing up the shutter blades until they come to rest in the Fig. 2 position. This occurs quickly but, nevertheless, the slight resistance offered by the delay mechanism prevents the blades from striking lug 29 and rebounding as otherwise might occur.

The blades will remain in the Fig. 2 position until pressure is released on the trigger handle 18 at which time the spring 19 moves the trigger until an arm 44 carried by the plate 17 moves through an arcuate path beneath the beveled lug 42 of the shutter-setting lever 25, thus raising this end of the lever. When the lever is raised, as is best shown in Fig. 6, the lug 29 is removed from the path of the shutter lug 15 and, consequently, the shutter blades may then return to their fully closed position under the influence of the spring 12.

If the pointer 27 is moved to the position shown in Fig. 3 for 1/25 of a second exposure, the surface 41 of lever 25 engages the upstanding lug 33 of the lever 31 and positions it for its maximum retard effect. This movement, of course, moves the bulb stop 29 away from the path of the shutter lug 15 which can now only strike the arm 30. For the faster exposures the arm 30 is moved gradually away from the path of the lug 15 until when the shutter is set for 1/200 of a second the arm 30 can no longer be engaged by the shutter blade lug 15, since it lies outside of the path of this lug.

I prefer to provide the shutter-setting lever 25 at the pointer end 27 with a formed indentation 50 which may drop into any one of a series of notches 51 cut in the flange 2, so that the natural spring of the lever 25 will tend to hold the pointer 27 in any set position. While this is not necessary, a "click stop" is quite useful not only because it tends to hold the shutter-setting lever in its set position, but also because it enables an operator to feel the correct location of the lever for the various speeds.

The operation of the bulb-exposure mechanism is extremely simple. When the setting pointer 27 is moved to the "B" position on the scale 28, the lug 29, which is the bulb stop, is moved into the path of the shutter lug 15. At the same time the surface 41 moves away from the lug 33, permitting it to move to its initial position under the influence of a spring 38 moving it against a stop pin 40. Thus, the arm 30 lies just in advance of the bulb stop 29 and when the shutter blade is released, the delay mechanism will slow up the blades before reaching the stop 29 to prevent rebound. The bulb stop 29 is removed from the path of the shutter trigger lug 15 when the arm 44 moves about pin 20 as the shutter 18 returns to its normal position of rest, since it passes under the beveled surface 43 of lug 42 and raises arm 25 a sufficient distance to release lug 15. Thus, any time the shutter blades are set, the bulb stop 29 cannot engage the lug 15 so that the blades move freely to their set position shown in Fig. 1. Of course, when the trigger 18 is depressed, the arm 44 is moved from under the lug 42 permitting the bulb stop to drop down to interrupt the movement of the shutter blades. This can only occur when the time-setting lever 25 is set for bulb exposures because any position to the left of the setting for bulb exposures removes the bulb stop 29 from the path of the lug 15. It will thus be seen that I have provided an extremely simple form of bulb mechanism in which no additional parts are necessary outside of the shutter-setting lever which also has other functions to perform and the mechanism is so arranged that the delay or retard mechanism is momentarily employed to cushion the blow of the shutter blades coming to rest in an open position.

Having thus described my invention, what I claim as new and desire to secure by Letters Patent of the United States is:

1. "Bulb" exposure mechanism for shutters comprising an apertured casing, a trigger pivotally carried by the casing and having a rest position and including a cover blind movable therewith, shutter blades pivotally mounted on the casing, a spring for driving the blades, a setting lever for moving the blades and tensioning the spring, means on a shutter blade and on the trigger for latching the blades and driving spring in a set position in which they are held by the trigger, a speed-setting lever adjustable to "bulb" and automatically controlled exposure positions, coacting elements on the speed-setting lever and a shutter blade for holding the blades in an open position when the trigger with its cover blind is moved and the aperture is uncovered, and means operable through direct engagement of the trigger and the speed-setting lever for engaging and moving the latter by the former preventing contact of the coacting elements while the trigger is in its rest position and while the cover blind covers the aperture, whereby the setting lever may move the blades to a set position without engaging the coacting elements.

2. "Bulb" exposure mechanism for shutters comprising an apertured casing, a pivoted shutter blade having a projection carried by the casing, a spring for moving the blade, a combined trigger and cover blind pivotally mounted in the casing and including a latch element, a handle for moving the shutter blade projection into engagement with the latch element to hold the shutter blade and spring in a set position, a setting lever pivotally mounted in the casing and movable to adjust the shutter for different exposures including "bulb", a "bulb" stop carried by the setting lever and movable to and from the path of movement of the projection on the shutter blade, and coacting surfaces on the combined trigger and cover blind and the setting lever for engaging and holding the setting lever "bulb" stop out of the path of movement of the shutter blade projection when the trigger is in its normal position of rest with the cover blind covering the aperture whereby the projection on the shutter blade may be freely moved past the "bulb" stop by the handle in setting the shutter blade and its spring.

3. "Bulb" exposure mechanism for shutters as defined in claim 2 characterized by the pivots for the trigger and the setting lever being spaced apart, and the coacting surface of the trigger and setting lever being movable in an arc about their pivots to and from an engaging position.

4. "Bulb" exposure mechanism for shutters as defined in claim 2 characterized by the pivots for the trigger and the setting lever being spaced apart, and the coacting surface of the trigger and setting lever being movable in an arc about their pivots to and from an engaging position, one coacting surface being inclined to raise the other coacting surface to raise the "bulb" stop out of the path of the shutter blade projection when the trigger is at rest, movement of the trigger toward a blade-releasing position moving one coacting surface from the other, said setting lever being resiliently pressed toward the shutter casing to move the "bulb" stop into the path of the blade projection when the trigger is moved.

5. "Bulb" exposure mechanism for shutters comprising an apertured casing, a pivoted shutter blade having a projection carried by the casing, a spring for moving the blade, a trigger pivotally mounted in the casing and including a cover blind and a latch element, a handle for moving the shutter blade projection into engagement with the latch element to hold the shutter blade and spring in a set position, a setting lever pivotally mounted in the casing and movable to adjust the shutter for different exposures including "bulb," a "bulb" stop carried by the setting lever and movable to and from the path of movement of the projection on the shutter blade, and a coacting surface on the trigger movable to engage and lie under the setting lever for holding the setting lever "bulb" stop in a raised position out of the path of movement of the shutter blade projection when the trigger is in its normal position of rest with the cover blind covering the aperture whereby the projection on the shutter blade may be freely moved past the "bulb" stop by the handle in setting the shutter blade and its spring, the setting lever coacting surface and the trigger coacting surfaces being shaped to be engageable only when the setting lever is set for "bulb" exposures, the "bulb" stop and the projection on the shutter leaf lying in intersecting paths only when the setting lever is moved to a "bulb" exposure position.

6. "Bulb" exposure mechanism for shutters comprising an apertured casing, a trigger pivotally carried by the casing and having a rest position, a cover blind carried by the trigger, shutter blades pivotally mounted on the casing, a spring for driving the blades, a setting lever for moving the blades and tensioning the spring, means carried by the trigger and one shutter blades for latching the blades and driving spring in a set position in which they are held by the trigger, a speed-setting lever adjustable to "bulb" and automatically controlled exposure positions, coacting elements on the setting lever and on a blade and movable into engagement for holding the blades in an open position with the aperture uncovered, a delay mechanism positionable to lie in the path of the blade coacting element in advance of the coacting element of the speed-setting lever whereby the shutter blade may be gradually slowed up before the coacting elements for holding the blades open are engaged.

7. "Bulb" exposure mechanism for shutters comprising an apertured casing, a pivoted shutter blade having a projection carried by the casing, a spring for moving the blade, a trigger pivotally mounted in the casing and including a latch element, a handle for moving the shutter blade projection into engagement with the latch element to hold the shutter blade and spring in a set position, a setting lever pivotally mounted in the casing and movable to adjust the shutter for different exposures including "bulb," a "bulb" stop carried by the setting lever and movable to and from the path of movement of the projection on the shutter blade, and coacting surfaces on the trigger and the setting lever for holding the setting lever "bulb" stop out of the path of movement of the shutter blade projection when the trigger is in its normal position of rest whereby the projection in the shutter blade may be freely moved past the "bulb" stop by the handle in setting the shutter blade and its spring, the setting lever coacting surface and the trigger coacting surfaces being shaped to be engageable only when the setting lever is set for "bulb" exposures, the "bulb" stop and the projection on the shutter leaf lying in intersecting paths only when the setting lever is moved to a "bulb" exposure position, and means for slowing up the shutter blades immediately before engagement of the coacting surfaces on the trigger and setting levers.

CARL C. FUERST.

REFERENCES CITED

The following references are of record in the file of this patent:

UNITED STATES PATENTS

| Number | Name | Date |
|---|---|---|
| 997,530 | Wollensak | July 11, 1911 |
| 1,124,313 | Pierman | Jan. 12, 1915 |
| 2,298,382 | Hutchison et al. | Oct. 13, 1942 |

Certificate of Correction

Patent No. 2,507,148                                                                    May 9, 1950

CARL C. FUERST

It is hereby certified that error appears in the printed specification of the above numbered patent requiring correction as follows:

Column 6, line 8, for the word "blades" read *blade*;

and that the said Letters Patent should be read with this correction therein that the same may conform to the record of the case in the Patent Office.

Signed and sealed this 25th day of July, A. D. 1950.

[SEAL]

THOMAS F. MURPHY,
*Assistant Commissioner of Patents.*